United States Patent
Arnell

(10) Patent No.: US 6,575,271 B2
(45) Date of Patent: Jun. 10, 2003

(54) BRAKE MECHANISM FOR RESILIENT WHEEL

(75) Inventor: Edward L. Arnell, Strafford, MO (US)

(73) Assignee: S.C. Wheel, LLC, Salem, MO (US)

(*) Notice: Subject to any disclaimer, the term of this patent is extended or adjusted under 35 U.S.C. 154(b) by 12 days.

(21) Appl. No.: 09/798,765

(22) Filed: Mar. 2, 2001

(65) Prior Publication Data

US 2002/0121409 A1 Sep. 5, 2002

(51) Int. Cl.[7] ................................................ B62L 3/00
(52) U.S. Cl. ........................................ 188/24.22; 152/39
(58) Field of Search .................... 188/24.11, 24.13, 188/24.22, 26, 17; 152/38, 39, 83; 267/36.1, 271, 260

(56) References Cited

U.S. PATENT DOCUMENTS

| | | |
|---|---|---|
| 652,837 A | 7/1900 | Donovan |
| 990,788 A | 4/1911 | Smith |
| 1,089,284 A | 3/1914 | Stewart |
| 1,100,133 A | 6/1914 | Hoen |
| 1,103,512 A | 7/1914 | Harrington |
| 1,160,119 A | 11/1915 | Adolfson |
| 1,187,203 A | 6/1916 | Terry et al. |
| 1,240,951 A | 9/1917 | Davis |
| 1,246,457 A | 11/1917 | Perry |
| 1,281,737 A | 10/1918 | Worsley |
| 1,437,150 A | 11/1922 | Ridenour |
| 3,704,740 A | 12/1972 | Moore |
| 4,027,746 A | 6/1977 | Kine |
| 4,136,759 A * | 1/1979 | Schoch .................. 188/24.12 |
| 4,240,483 A | 12/1980 | Gregoric |
| 4,263,990 A | 4/1981 | Yoshigai |
| 4,553,577 A | 11/1985 | Gregg |
| 4,633,978 A * | 1/1987 | Hoff ...................... 188/196 M |
| 4,782,875 A | 11/1988 | Jones |
| 4,852,698 A | 8/1989 | Nagano |
| 5,125,443 A | 6/1992 | Schwartzman |
| 5,253,849 A | 10/1993 | Kamada |
| 6,206,144 B1 * | 3/2001 | Di Bella .................... 188/26 |
| 6,264,008 B1 * | 7/2001 | Jordan et al. ........... 188/24.19 |

* cited by examiner

Primary Examiner—Christopher P. Schwartz
Assistant Examiner—Melanie Torres
(74) Attorney, Agent, or Firm—Thompson Coburn, LLP

(57) ABSTRACT

A wheel and brake system is provided for a vehicle having a wheel with an inner wheel, an outer wheel generally concentric with the inner wheel, and a plurality of resilient members connecting the inner and outer wheels together for resilient movement therebetween. The brake mechanism has a mounting block adjacent the inner wheel and a lever arm pivotally connected thereto for movement between a braking position and a non-braking position. The lever arm has a cam follower with a cam engaging portion that allows the lever arm to move from its non-braking position toward its braking position which in turn causes movement of the cam follower from a disengaged position toward a wheel-engaging position. The cam follower has a wheel-engaging portion adapted for frictional engagement with the inner wheel when the cam follower is in its wheel-engaging position.

25 Claims, 4 Drawing Sheets

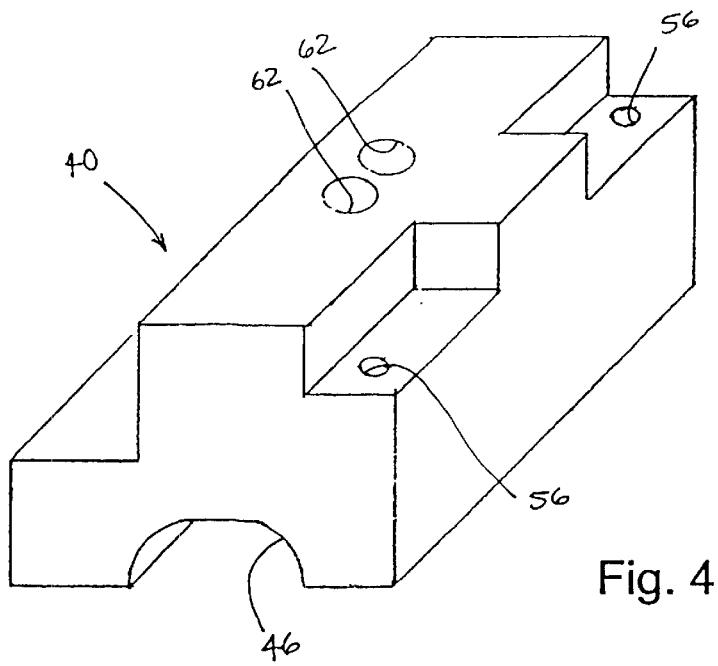
Fig. 4
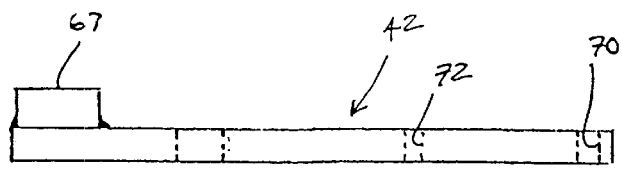
Fig. 6
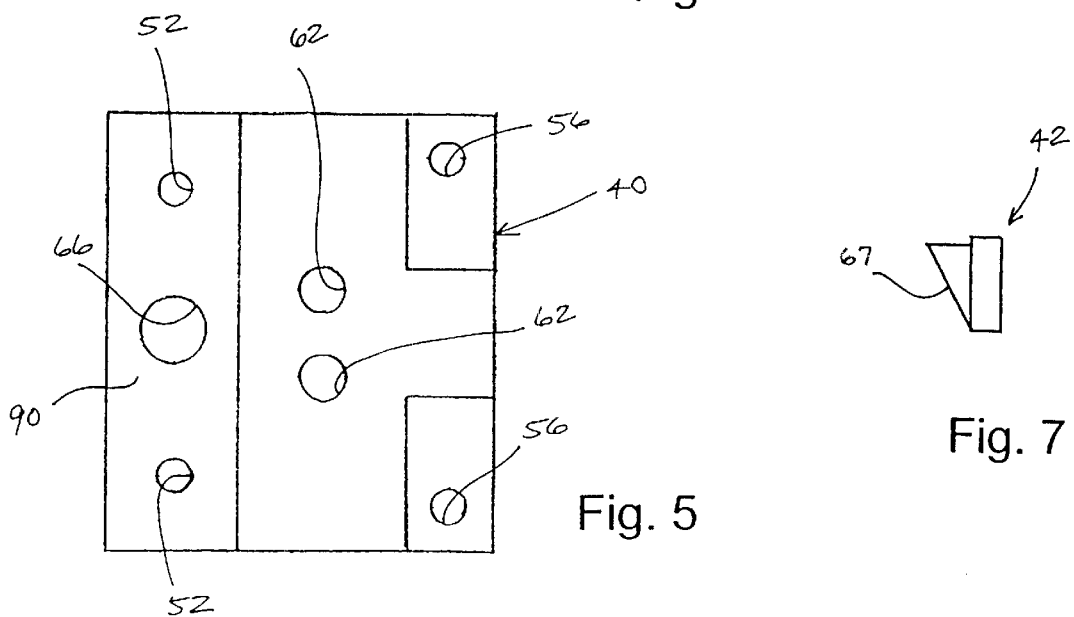
Fig. 5
Fig. 7

BRAKE MECHANISM FOR RESILIENT WHEEL

BACKGROUND OF THE INVENTION

The present invention relates to resilient wheels and brake mechanisms therefor. More particularly, the present invention relates to brake mechanisms adapted for use in connection with resilient wheels having generally concentric inner and outer wheel portions that are connected to one another by resilient members in a manner to permit resilient, shock-absorbing movement between the inner and outer wheel portions.

In general, resilient wheels comprising an inner hub and an outer wheel portion resiliently connected to one another are known in the art. In such resilient wheels, the inner hub and outer wheel portion are typically connected to one another by a plurality of resilient spring members in a manner to permit resilient movement of the outer wheel portion relative to the hub to absorb shock and to displace external loads. Many such resilient wheels were designed in the early 1900's in response to rapid growth of the automobile industry. A primary goal of such designs was to provide a means for absorbing shock and providing a smoother ride, in a time before pneumatic automobile tires were prevalent.

Resilient wheels of this type have not been effectively used in connection with bicycles. This is partly because conventional caliper-style bicycle brake mechanisms are not particularly suited for use with such resilient wheels. In general, conventional caliper-style bicycle brake mechanisms have brake pads that are positioned adjacent the outer rim of the bicycle wheel for frictional engagement therewith. However, the outer wheel rim of a resilient wheel does not have a fixed path of rotation relative to the hub and axle. In general, the inner hub of a resilient wheel is mounted for rotation about the axle. The outer wheel portion is connected to the hub by resilient spring members in a manner to permit resilient movement of the outer wheel portion relative to the hub. This resilient movement of the outer wheel portion allows the outer wheel portion to be displaced relative to the inner hub in response to external loads. Thus, the outer wheel rim of a resilient wheel does not have a fixed path of rotation like the rim of a conventional bicycle wheel with rigid spokes and, consequently, conventional caliper-style bicycle brake mechanisms that engage with the outer wheel rim are not suitable for use with resilient wheels.

SUMMARY OF THE INVENTION

It is an object of the present invention to provide a brake mechanism suitable for use with resilient wheels. A more specific object of the invention is to provide a brake mechanism adapted for use with a resilient wheel in a manner that permits resilient displacement of an outer wheel portion relative to an inner wheel portion of the resilient wheel. Another object of the invention is to provide a cam action brake mechanism adapted for use with both resilient wheels and conventional wheels.

In general, a wheel and brake system of the present invention comprises an inner wheel, an outer wheel and a brake mechanism. The inner wheel is adapted to be rotatably mounted to a vehicle. The outer wheel is positioned generally concentric with the inner wheel. A plurality of resilient members connect the inner and outer wheel to one another in a manner to permit resilient movement of the outer wheel relative to the inner wheel. The brake mechanism comprises a mounting block, a lever arm and a cam follower. The mounting block is adapted to be mounted to the vehicle adjacent the inner wheel. The lever arm is pivotally connected to the mounting block in a manner to permit pivoting movement of the lever arm relative to the mounting block. The lever arm is movable relative to the mounting block between a braking position and a non-braking position. The lever arm includes a cam surface. The cam follower is connected to the mounting block in a manner to permit reciprocating movement of the cam follower relative to the mounting block. The cam follower is movable relative to the mounting block between a wheel-engaging position and a disengaged position. The cam follower has a cam engaging portion that is adapted for camming engagement with the cam surface of the lever arm in a manner so that movement of the lever arm from its non-braking position toward its braking position causes movement of the cam follower from its disengaged position toward its wheel-engaging position. The cam follower has a wheel-engaging portion that is adapted for frictional engagement with the inner wheel when the cam follower is in its wheel-engaging position.

In another aspect of the invention, a wheel and brake system comprises an inner wheel, an outer wheel positioned generally concentric with the inner wheel, a plurality of resilient members connecting the inner and outer wheels to one another for resilient relative movement, and a brake mechanism. The brake mechanism includes a mounting member adapted to be mounted to the vehicle, first and second lever arms, and an actuating member. The first lever arm is pivotally connected to the mounting member in a manner to permit pivoting movement of the first lever arm relative to the mounting member between a braking position and a non-braking position. Similarly, the second lever arm is pivotally connected to the mounting member in a manner to permit pivoting movement of the second lever arm relative to the mounting member between a braking position and a non-braking position. The first lever arm has a first wheel-engaging portion adapted for frictional engagement with a first side of the inner wheel when the first lever arm is in its braking position. Similarly, the second lever arm has a second wheel-engaging portion adapted for frictional engagement with a second side of the inner wheel when the second lever arm is in its braking position. The actuating member is operatively connected to the first and second lever arms in a manner to cause movement of the first and second lever arms from their respective non-braking positions to their respective braking positions.

A cam action brake mechanism of the present invention comprises a mounting block, a lever arm and a cam follower. The mounting block is adapted for mounting the brake mechanism to a vehicle. The lever arm is pivotally connected to the mounting block in a manner to permit pivoting movement of the lever arm relative to the mounting block between a braking position and a non-braking position. The lever arm includes a cam surface. The cam follower is connected to the mounting block in a manner to permit reciprocating movement of the cam follower relative to the mounting block between a wheel-engaging position and a disengaged position. The cam follower has a cam engaging portion that is adapted for camming engagement with the cam surface of the lever arm in a manner so that movement of the lever arm from its non-braking position toward its braking position causes movement of the cam follower from its disengaged position toward its wheel-engaging position. The cam follower has a wheel-engaging portion adapted for frictional engagement with a wheel of the vehicle when the brake mechanism is mounted to the vehicle and when the cam follower is in its wheel-engaging position.

While the principal advantages and features of the present invention have been described above, a more complete and thorough understanding and appreciation for the invention may be attained by referring to the drawings and description of the preferred embodiments, which follows.

BRIEF DESCRIPTION OF THE DRAWINGS

FIG. 4 is a perspective view of the mounting block of the brake mechanism;

FIG. 5 is a side elevational view of the mounting block shown in FIG. 4;

FIG. 6 is a top plan view of the lever arm of the brake mechanism;

FIG. 7 is an end elevational view of the lever arm of FIG. 6, showing the camming surface of the lever arm.

Reference characters used in the written specification refer to corresponding parts shown in the drawings.

DETAILED DESCRIPTION OF THE PREFERRED EMBODIMENTS

Figure 1:
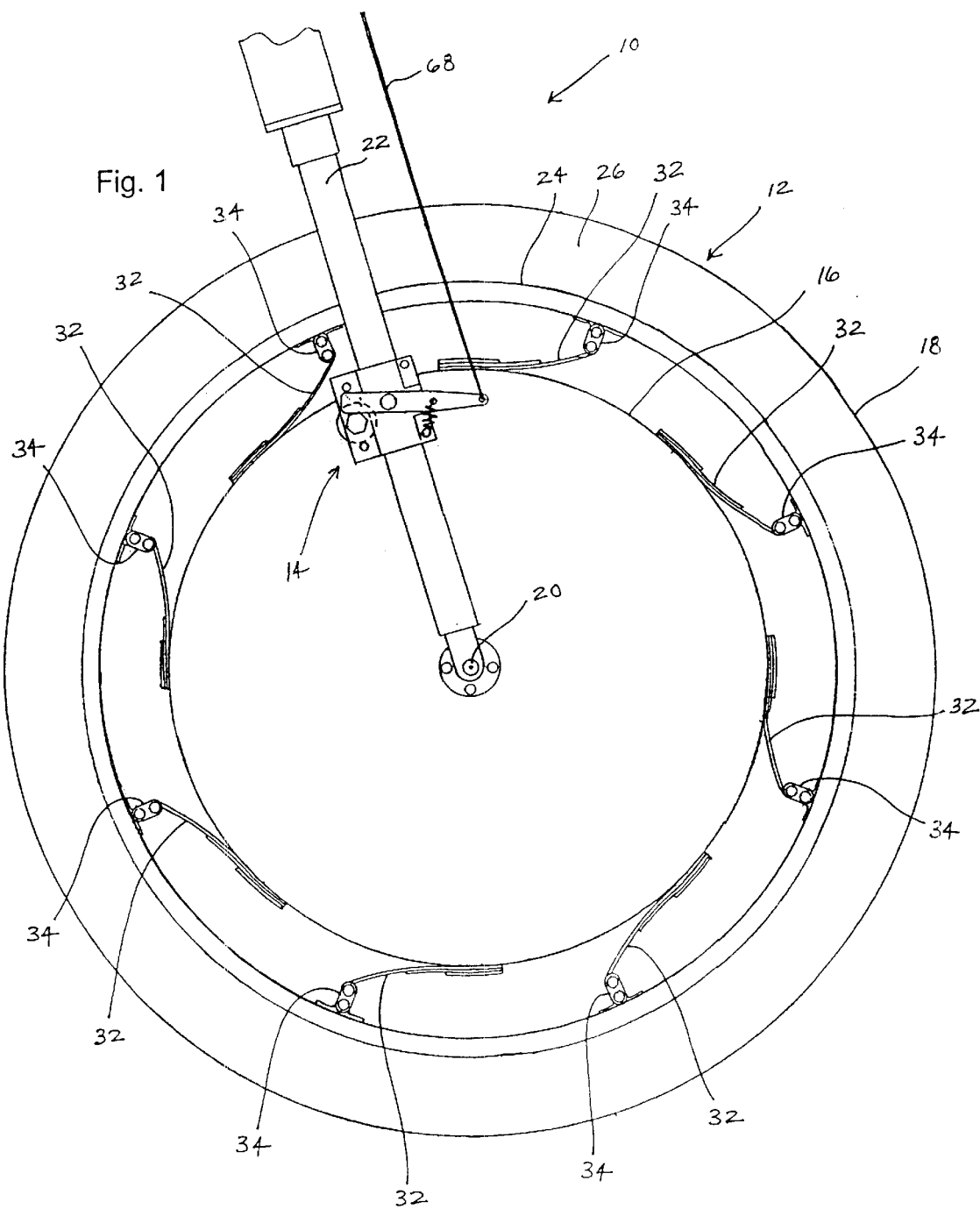
FIG. 1 is a partial side elevational view of a vehicle incorporating the wheel and brake system of the present invention.

A wheel and brake system of the present invention is represented generally in FIG. 1 by the reference numeral 10. The system comprises a resilient wheel, represented generally by the reference numeral 12, and a brake mechanism, represented generally by the reference numeral 14.

With continued reference to FIG. 1, the resilient wheel 12 comprises an inner wheel (or hub) 16 and an outer wheel 18. The inner wheel 16 is rotatably mounted to a vehicle axle 20, which is supported from the vehicle by support arms (or forks) 22. The outer wheel 18 surrounds the inner wheel 16 and is generally concentric with the inner wheel 16 when the resilient wheel 12 is at equilibrium, as described below. Preferably, the outer wheel 18 has an outer peripheral portion 24 adapted to support a tire 26. For optimal traction, shock absorption and overall performance, the tire 26 is a preferably a pneumatic tire, although other types of tires (e.g., solid rubber) could be used without departing from the scope of the present invention. Alternatively, the outer peripheral portion 24 of the outer wheel 18 could be configured for direct ground engagement (i.e. with no tire at all) without departing from the scope of the present invention.

A plurality of resilient members 32 connect the outer wheel 18 to the inner wheel 16. As shown in FIG. 1, the resilient members 32 are preferably spaced generally circumferentially about the inner and outer wheels. Preferably, the resilient members 32 comprise resilient leaf springs that are adapted to deform elastically in response to external forces and to return to equilibrium positions when the external forces are removed. However, other types of resilient members (e.g., coil springs) that are adapted to elastically deform in response to external forces could be used without departing from the scope of the present invention.

The resilient leaf springs 32 connect the inner and outer wheels 16 and 18 in a manner to efficiently transfer rotational motion between the inner and outer wheels 16 and 18. Thus, the inner and outer wheels 16 and 18 both rotate about the axle 20 together as a unit. The leaf springs 32 also permit resilient movement of the outer wheel 18 relative to the inner wheel 16 in response to external forces applied to the outer wheel 18. In operation, when the outer wheel 18 encounters an external force (e.g., bumps, pot holes, etc.), the resilient leaf springs 32 flex in a manner to permit movement of the outer wheel 18 relative to the inner wheel 18 to absorb the shock. Thus, the path of rotation of the outer wheel 18 is generally concentric with the inner wheel 16 and axle 20 when the wheel 12 is in an equilibrium condition, but the path of rotation of the outer wheel 18 is eccentric relative to the inner wheel 16 and axle 20, at least momentarily, when the outer wheel 18 moves in response to an external force. Due to the resiliency of the leaf springs 32 (more particularly, the restoring forces stored in the leaf springs 32 due to their temporary elastic deformation), the outer wheel 18 is re-centered after the external force is removed, and the paths of rotation of the inner and outer wheels 16 and 18 are then generally concentric again. Depending on the spring constants of the leaf springs 32, the outer wheel 18 may be slightly off center relative to the inner wheel 16, even when at rest, due to the weight of the vehicle itself.

Preferably, at least one end of each of the leaf springs 32 is pivotally connected to one of the inner and outer wheels 16 and 18. As shown in FIG. 1, each of the leaf springs 32 is pivotally connected to the outer wheel 18 by pivot links 34, and the opposite end of each of the leaf springs 32 is fixedly connected to the inner wheel 16 with a mechanical fastener such as a rivet. Alternatively, the leaf springs 32 could be pivotally connected to the inner wheel 16, or to both the inner and outer wheels 16 and 18, without departing from the scope of the present invention. This freedom of action is important because it reduces the likelihood that the leaf springs 32 will be bent or broken under strain at the points of connection.

Thus, when an external load is applied generally inwardly against one portion of the outer wheel 18, the leaf springs 32 closest to where the force is applied will be compressed or flattened to permit the inner and outer wheels 16 and 18 to move closer to one another, and the leaf springs 32 at the opposite end of the wheel (i.e., 180 degrees from the location of the external force) will be drawn away in tension from the inner and outer wheels 16 and 18 to permit the inner and outer wheels to move away from one another at that location. The pivot links 34 facilitate this movement of the leaf springs 32. The leaf springs 32 at the sides (i.e., 90 degrees and 270 degrees from the location of the external force) will not be in substantial compression or tension, but the points of connection will be subjected to shear forces. The pivot links help to accommodate such shear forces by allowing some limited relative movement between the inner and outer wheels 16 and 18 without putting excessive strain on the leaf springs 32.

Figure 2:
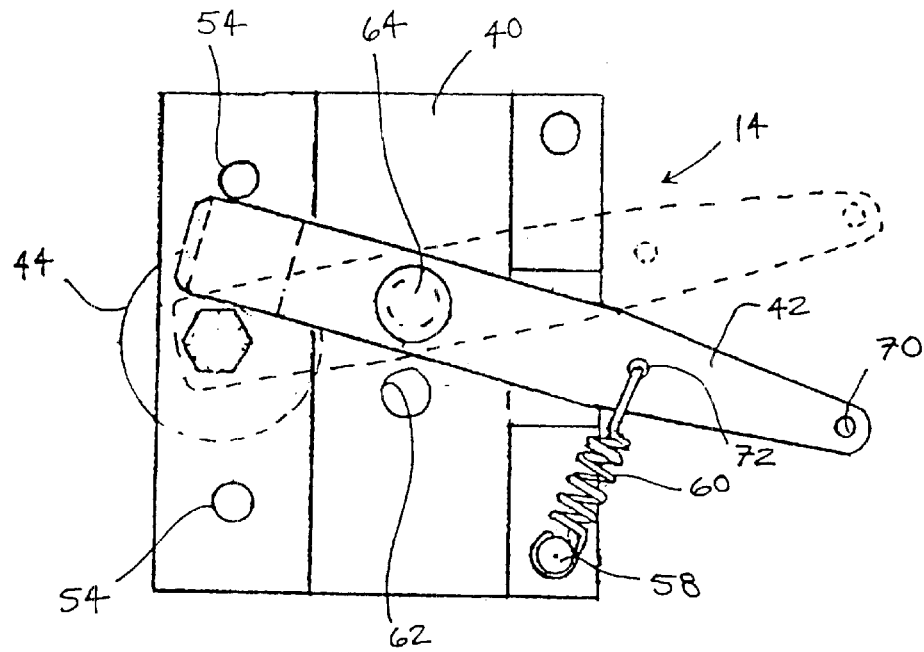
FIG. 2 is an enlarged side elevational view of the brake mechanism shown in FIG. 1.
Figure 3:
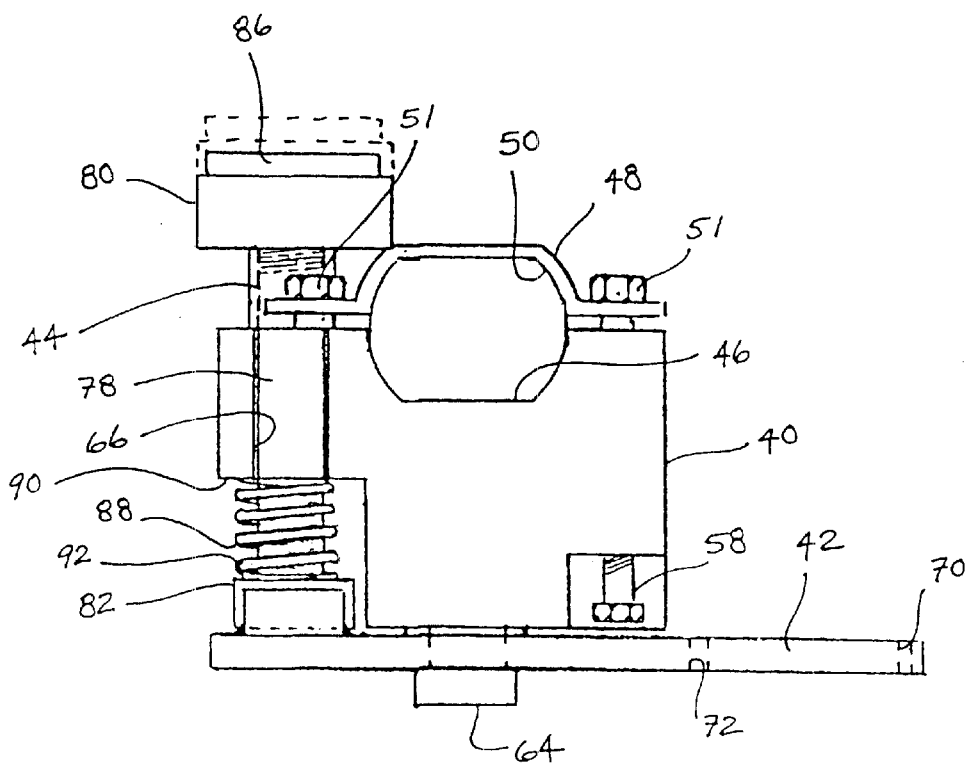
FIG. 3 is a top plan view of the brake mechanism.

As best shown in FIGS. 2 and 3, the brake mechanism 14 comprises a mounting block 40, a lever arm 42 and a cam follower 44. The mounting block 40 is adapted to be mounted to one of the vehicle's support arms (or forks) 22 adjacent the inner wheel 16 (see FIG. 1). As shown in FIGS. 3 and 4, an inner portion of the mounting block 40 includes a recess 46 sized and configured to receive a portion of the support arm 22 to which it is mounted. A mounting bracket 48 fits around the opposite side of the support arm 22 to hold the mounting block 40 securely on the support arm 22. The bracket 48 includes a similar recess 50 to accommodate a portion of the support arm 22 to which the mounting block 40 is secured. The mounting bracket 48 and mounting block 40 are connected to one another with mechanical fasteners 51, which allow for efficient installation and adjustment of the mounting block 40.

Details of the mounting block 40 itself are shown in FIGS. 4 and 5. The mounting block 40 includes small bores 52 adapted to receive small roll pins 54 (see FIG. 2) for limiting the extent of the movement of the lever arm 42, as described below. Another set of small bores 56 are each sized to receive a small bolt 58, which is adapted to support a small tension spring 60 for returning the lever arm 42 to a starting position, as described below. The mounting block 40 also includes two pivot bores 62, each of which is adapted to receive a pivot pin 64 for pivoting the lever arm 42 relative to the mounting block 40. In addition, the mounting block 40 includes a larger transverse bore 66 for receiving the cam follower 44 in a manner to permit reciprocating movement of the cam follower 44 therein relative to the mounting block 40.

It should be noted that in FIG. 2, only one of the pivot bores 62 is needed and, similarly, only one of the tension spring supporting bolts 58 is needed. However, the same mounting block 40 can be used on the opposite support arm (not shown), albeit inverted, where the other pivot bore 62 and tension spring supporting bolt 58 will be used. Thus, a single casting can be used for both mounting blocks.

As discussed above, the lever arm 42 is pivotally connected to the mounting block 40 by the pivot pin 64 in a manner to permit pivoting movement of the lever arm 42 relative to the mounting block 40. The lever arm 42 is movable relative to the mounting block 40 between a braking position (shown in phantom lines in FIG. 2) and a non-braking position (shown in solid lines in FIG. 2). As best shown in FIG. 7, one end of the lever arm 42 includes a cam surface 56. Preferably, the cam surface 56 is an inclined surface that is generally linear. However, the cam surface 56 could also be an arcuate, or partially arcuate surface without departing from the scope of the invention. An opposite end of the lever arm 42 includes a small aperture 70 adapted for connection to a brake cable 68 (see FIG. 1) for actuating the lever arm 42. Another small aperture 72, located between the pivot pin 64 and the brake cable aperture 70, is adapted for connecting the tension spring 60 to the lever arm 42. As described above, and as shown in FIG. 2, the other end of the tension spring 60 is connected to the bolt 58 extending from the mounting block 40. The tension spring 60 is adapted to return the lever arm 42 to its non-braking position (shown in solid lines in FIG. 2).

As best shown in FIG. 3, the cam follower 44 is connected to the mounting block 40 in a manner to permit reciprocating movement of the cam follower 44 relative to the mounting block 40. The transverse bore 66 is sized to receive a cylindrical body portion 78 of the cam follower 44 for reciprocating movement therein. The cam follower 44 includes a wheel-engaging portion 80 on one end of the cylindrical body portion 78 and a cam-engaging portion 82 on the opposite end of the cylindrical body portion 78. As shown in FIG. 3, the cam follower 44 is movable relative to the mounting block 40 between a wheel-engaging position (shown in phantom lines in FIG. 3) and a disengaged position (shown in solid lines in FIG. 3). The cam-engaging portion 82 of the cam follower 44 is adapted for camming engagement with the cam surface 56 of the lever arm 42 in a manner so that movement of the lever arm 42 from its non-braking position (shown in solid lines in FIG. 2) toward its braking position (shown in phantom lines in FIG. 2) causes movement of the cam follower 44 from its disengaged position (shown in solid lines in FIG. 3) toward its wheel-engaging position (shown in phantom lines in FIG. 3). The wheel-engaging portion 80 of the cam follower 44 includes a brake pad 86, preferably of an elastomeric material such as hard rubber, which is adapted for frictional engagement with the inner wheel 16 when the cam follower 44 is in its wheel-engaging position.

As shown in FIG. 3, a return spring 88 is positioned between cam follower 44 and the mounting block 40. Preferably, one end of the return spring 88 is in abutting engagement with a recessed surface 90 of the mounting block 40 and an opposite end of the return spring 88 is in abutting engagement with an annular shoulder portion 92 of the cam-engaging portion 82 of the cam follower 44. Preferably, the return spring 88 is a compression spring that biases the cam follower 44 toward its disengaged position (shown in solid lines in FIG. 3). Alternatively, the return spring could be a tension spring connected between the mounting block and the wheel-engaging portion 80 of the cam follower 44 without departing from the scope of the invention.

Figure 8:
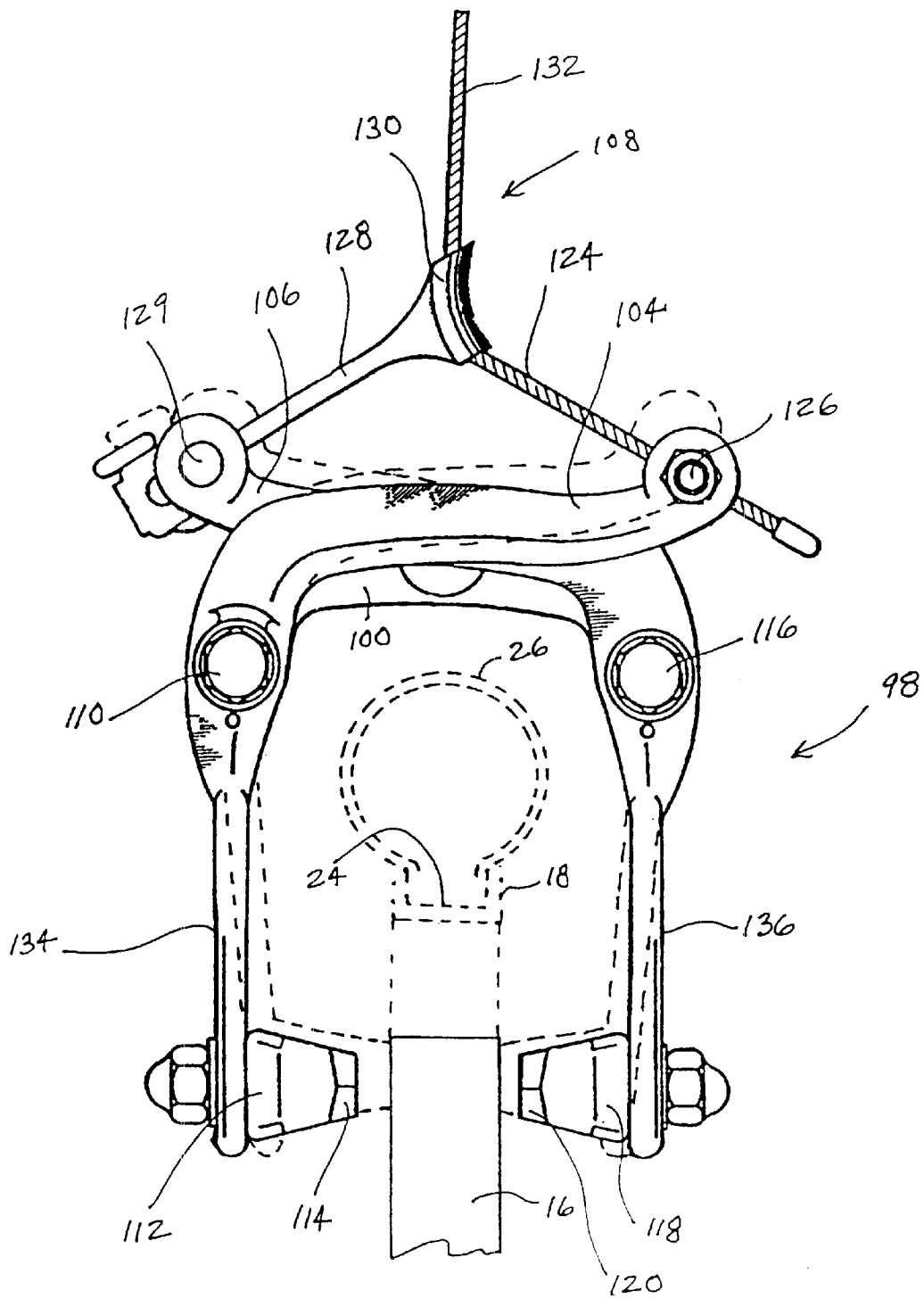
FIG. 8 is a partial front elevational view of another embodiment of the wheel and brake system of the present invention.

FIG. 8 is a partial front elevational view of a vehicle incorporating a another embodiment of a wheel and brake system of the present invention. The brake mechanism, shown generally as 98, is adapted for use in connection with a resilient wheel 12 of the type described above. In general, the brake mechanism 98 comprises a mounting member 100 adapted to be mounted to the vehicle (not shown), a first lever arm 104, a second lever arm 106 and an actuating member 108. As shown in FIG. 8, the mounting member 100 is preferably mounted to the vehicle at a location radially outwardly from the outer wheel 18.

The first lever arm 104 is pivotally connected to the mounting member 100 by a pivot pin 110 in a manner to permit pivoting movement of the first lever arm 104 relative to the mounting member between a braking position (shown in phantom lines in FIG. 8) and a non-braking position (shown in solid lines in FIG. 8). The first lever arm 104 has a first wheel-engaging portion 112 at one end. The first wheel-engaging portion 112 includes a brake pad 114, preferably of an elastomeric material such as hard rubber, which is adapted for frictional engagement with a first side of the inner wheel 16 when the first lever arm 104 is in its braking position.

Similarly, the second lever arm 106 is pivotally connected to the mounting member 100 by a pivot pin 116 in a manner to permit pivoting movement of the second lever arm 106 relative to the mounting member between a braking position (shown in phantom lines in FIG. 8) and a non-braking position (shown in solid lines in FIG. 8). The second lever arm 106 has a second wheel-engaging portion 118 at one end. The second wheel-engaging portion 118 also includes a brake pad 120, which is preferably of an elastomeric material such as hard rubber. Like the brake pad 114 of the first wheel-engaging portion 112 of the first lever arm 104, the brake pad 120 is adapted for frictional engagement with a second side of the inner wheel 16 when the second lever arm 106 is in its braking position.

As shown in FIG. 8, the actuating member 108 preferably comprises a brake cable 124, which is operatively connected to both of the first and second lever arms 104 and 106 in a manner to cause movement of the first and second lever arms 104 and 106 from their respective non-braking positions (shown in solid lines in FIG. 8) toward their respective braking positions (shown in phantom lines in FIG. 8). As shown in FIG. 8, a lower end of the brake cable 124 is connected to the first lever arm 104 with a mechanical fastener 126. A cable retainer 128 extends from the second lever arm 106 to the brake cable 124. A proximal end of the cable retainer 128 is connected to the second lever arm 106 by a mechanical fastener 129. A distal end of the cable retainer 128 includes a grip 130 configured to securely retain a portion of the brake cable 124. Thus, an upper end 132 of the brake cable is operatively connected to both the first lever arm 104 and the second lever arm 106 so that upward movement of the upper end 132 of the brake cable causes the first and second lever arms 104 and 106 to move from their respective non-braking positions (shown in solid lines in FIG. 8) toward their respective braking positions (shown in phantom lines in FIG. 8).

Thus far, the brake mechanism 98 described is similar in most respects to a conventional center-pull type caliper brake for bicycles. However, the brake mechanism 98 is adapted for use with the resilient wheel 12 of the invention. As shown in FIG. 8, extended portions 134 and 136 of the first and second lever arms 104 and 106 extend radially inwardly from the mounting member 100 toward the inner wheel 16. The extended portions 134 and 136 are spaced from the outer wheel 18 throughout the entire range of motion of the first and second lever arms 104 and 106 so as not to interfere with the rotational movement of the outer wheel or radial movement of the outer wheel 18 relative to the inner wheel 16. Also, it should be understood that, although the brake mechanism 98 shown in FIG. 8 and described above is similar to a conventional center-pull type caliper brake, a side-pull type caliper brake configuration could also be employed without departing from the scope of the invention.

In view of the above, it can be seen that the present invention overcomes problems associated with the prior art and achieves other advantageous results. As various changes could be made without departing from the scope of the invention, it is intended that all matter contained in the above description and shown in the accompanying drawings be interpreted as illustrative and not limiting. It should be understood that other configurations of the present invention could be constructed, and different uses could be made, without departing from the scope of the invention as set forth in the following claims.

What is claimed is:

1. A wheel and brake system comprising:
   an inner wheel adapted to be rotatably mounted to a vehicle;
   an outer wheel positioned generally concentric with the inner wheel;
   a plurality of resilient members connecting the inner and outer wheels to one another in a manner to permit resilient movement of the outer wheel relative to the inner wheel; and
   a brake mechanism comprising:
      a mounting block adapted to be mounted to the vehicle adjacent the inner wheel;
      a lever arm pivotally connected to the mounting block in a manner to permit pivoting movement of the lever arm relative to the mounting block between a braking position and a non-braking position, the lever arm having a cam surface and a center axis of rotation about which the lever arm pivots relative to the mounting block; and
      a cam follower connected to the mounting block in a manner to permit reciprocating movement of the cam follower relative to the mounting block in a lateral direction that is parallel to the center axis of rotation of the lever arm where the cam follower is movable between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with the inner wheel when the cam follower is in its wheel-engaging position.

2. The wheel and brake system of claim 1 wherein the resilient members are spaced generally circumferentially about the inner and outer wheels.

3. The wheel and brake system of claim 2 wherein each of said resilient members comprises a leaf spring.

4. The wheel and brake system of claim 3 wherein at least one end of each of the leaf springs is pivotally connected to one of the inner and outer wheels.

5. The wheel and brake system of claim 1 wherein the outer wheel has an outer peripheral portion adapted to support a tire.

6. The wheel and brake system of claim 1 further comprising a return spring connected to the cam follower and the mounting block in a manner to bias the cam follower toward its disengaged position.

7. The wheel and brake system of claim 1 wherein the brake mechanism is positioned relative to the inner wheel so that the wheel-engaging portion of the cam follower frictionally engages a side surface of the inner wheel when the cam follower is in its wheel-engaging position.

8. The wheel and brake system of claim 1 wherein the cam surface is generally planar.

9. The wheel and brake system of claim 1 wherein the wheel-engaging portion of the cam follower includes an elastomeric brake pad.

10. A wheel and brake system comprising:
    an inner wheel adapted to be rotatably mounted to a vehicle;
    an outer wheel positioned generally concentric with the inner wheel;
    a plurality of resilient members connecting the inner and outer wheels to one another in a manner to permit resilient movement of the outer wheel relative to the inner wheel; and
    a brake mechanism comprising:
       a mounting block adapted to be mounted to the vehicle adjacent the inner wheel;
       a lever arm pivotally connected to the mounting block in a manner to permit pivoting movement of the lever arm relative to the mounting block between a braking position and a non-braking position, the lever arm having a cam surface; and
       a cam follower connected to the mounting block in a manner to permit reciprocating movement of the cam follower relative to the mounting block between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with the inner wheel when the cam follower is in its wheel-engaging position;

further comprising a return spring connected to the cam follower and the mounting block in a manner to bias the cam follower toward its disengaged position; and wherein the return spring is a compression spring.

11. A wheel and brake system comprising:

an inner wheel adapted to be rotatably mounted to a vehicle;

an outer wheel positioned generally concentric with the inner wheel;

a plurality of resilient members connecting the inner and outer wheels to one another in a manner to permit resilient movement of the outer wheel relative to the inner wheel; and a brake mechanism comprising:
  a mounting block adapted to be mounted to the vehicle adjacent the inner wheel;
  a lever arm pivotally connected to the mounting block in a manner to permit pivoting movement of the lever arm relative to the mounting block between a braking position and a non-braking position, the lever arm having a cam surface; and
  a cam follower connected to the mounting block in a manner to permit reciprocating movement of the cam follower relative to the mounting block between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with the inner wheel when the cam follower is in its wheel-engaging position;

the outer wheel has an outer peripheral portion adapted to support a tire; and the outer peripheral portion is adapted to support a pneumatic tire.

12. A wheel and brake system comprising:

an inner wheel adapted to be rotatably mounted to a vehicle;

an outer wheel positioned generally concentric with the inner wheel;

a plurality of resilient members connecting the inner and outer wheels to one another in a manner to permit resilient movement of the outer wheel relative to the inner wheel; and a brake mechanism comprising:
  a mounting block adapted to be mounted to the vehicle adjacent the inner wheel;
  a lever arm pivotally connected to the mounting block in a manner to permit pivoting movement of the lever arm relative to the mounting block between a (braking position and a non-braking position, the lever arm having a cam surface; and
  a cam follower connected to the mounting block in a manner to permit reciprocating movement of the cam follower relative to the mounting block between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with the inner wheel when the cam follower is in its wheel-engaging position; and further comprising a lever spring connected to the lever arm and the mounting block in a manner to bias the lever arm toward its non-braking position.

13. The wheel and brake system of claim 12 wherein the lever spring is a tension spring.

14. A cam-action brake mechanism comprising:

a mounting block adapted for mounting the brake mechanism to a vehicle;

a lever arm pivotally connected to the mounting block in a manner to permit pivoting movement of the lever arm relative to the mounting block between a braking position and a non-braking position, the lever arm having a cam surface and a center axis of rotation about which the lever arm pivots relative to the mounting block; and a cam follower connected to the mounting block in a manner to permit reciprocating movement of the cam follower relative to the mounting block in a lateral direction that is parallel to the center axis of rotation of the lever arm where the cam follower is movable between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with a wheel of the vehicle when the brake mechanism is mounted to the vehicle and when the cam follower is in its wheel-engaging position.

15. The brake mechanism of claim 14 wherein the mounting block is adapted for mounting the brake mechanism to a vehicle with a resilient wheel having an inner wheel rotatably mounted to the vehicle, an outer wheel positioned generally concentric with the inner wheel, and a plurality of resilient members connecting the inner and outer wheels to one another in a manner to permit resilient movement of the outer wheel relative to the inner wheel.

16. The brake mechanism of claim 14 further comprising a second spring connected to the cam follower and the mounting block in a manner to bias the cam follower toward its disengaged position.

17. The brake mechanism of claim 14 wherein the cam surface is generally planar.

18. The brake mechanism of claim 14 wherein the wheel-engaging portion of the cam follower includes an elastomeric brake pad.

19. A cam-action brake mechanism comprising:

a mounting block adapted for mounting the brake mechanism to a vehicle;

a lever arm pivotally connected to the mounting block in a manner to permit pivoting movement of the lever arm relative to the mounting block between a braking position and a non-braking position, the lever arm having a cam surface;

a cam follower connected to the mounting block in a manner to permit reciprocating movement of the cam follower relative to the mounting block between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with a wheel of the vehicle when the brake mechanism is mounted to the vehicle and when the cam follower is in its wheel-engaging position; and further comprising a first spring connected to the lever arm and the mounting block in a manner to bias the lever arm toward its non-braking position.

20. The brake mechanism of claim 19 wherein the first spring is a tension spring.

21. A cam-action brake mechanism comprising:

a mounting block adapted for mounting the brake mechanism to a vehicle;

a lever arm pivotally connected to the mounting block in a manner to permit pivoting movement of the lever arm relative to the mounting block between a braking position and a non-braking position, the lever arm having a cam surface;

a cam follower connected to the mounting block in a manner to permit reciprocating movement of the cam follower relative to the mounting block between a wheel-engaging position and a disengaged position, the cam follower having a cam engaging portion that is adapted for camming engagement with the cam surface of the lever arm in a manner so that movement of the lever arm from its non-braking position toward its braking position causes movement of the cam follower from its disengaged position toward its wheel-engaging position, the cam follower having a wheel-engaging portion adapted for frictional engagement with a wheel of the vehicle when the brake mechanism is mounted to the vehicle and when the cam follower is in its wheel-engaging position;

further comprising a second spring connected to the cam follower and the mounting block in a manner to bias the cam follower toward its disengaged position; and the second spring is a compression spring.

22. A wheel and brake system comprising:

an inner wheel adapted to be rotatably mounted to a vehicle;

an outer wheel positioned generally concentric with the inner wheel;

a plurality of resilient members connecting the inner and outer wheels to one another in a manner to permit resilient movement of the outer wheel relative to the inner wheel; and a brake mechanism comprising:

a mounting member adapted to be mounted to the vehicle;

a first lever arm pivotally connected to the mounting member in a manner to permit pivoting movement of the first lever arm relative to the mounting member between a braking position and a non-braking position, the first lever arm having a first wheel-engaging portion adapted for frictional engagement with a first side of the inner wheel when the first lever arm is in its braking position;

a second lever arm pivotally connected to the mounting member in a manner to permit pivoting movement of the second lever arm relative to the mounting member between a braking position and a non-braking position, the second lever arm having a second wheel-engaging portion adapted for frictional engagement with a second side of the inner wheel when the second lever arm is in its braking position; and an actuating member operatively connected to the first and second lever arms in a manner to cause movement of the first and second lever arms from their respective non-braking positions to their respective braking positions.

23. The wheel and brake system of claim 22 wherein the mounting member of the brake mechanism is adapted to be mounted to the vehicle at a location radially outwardly from the outer wheel.

24. The wheel and brake system of claim 23 wherein extended portions of the first and second lever arms extend radially inwardly from the mounting member to the inner wheel.

25. The wheel and brake system of claim 24 wherein said extended portions are spaced from the outer wheel throughout the entire range of motion of the first and second lever arms.

* * * * *